(12) United States Patent
Ezrielev et al.

(10) Patent No.: US 12,450,345 B2
(45) Date of Patent: Oct. 21, 2025

(54) SYSTEM AND METHOD FOR MEMORY-LESS ANOMALY DETECTION USING AN AUTOENCODER

(71) Applicant: Dell Products L.P., Round Rock, TX (US)

(72) Inventors: Ofir Ezrielev, Beer Sheva (IL); Nadav Azaria, Beer Sheva (IL); Avitan Gefen, Tel Aviv (IL)

(73) Assignee: Dell Products L.P., Round Rock, TX (US)

(*) Notice: Subject to any disclaimer, the term of this patent is extended or adjusted under 35 U.S.C. 154(b) by 181 days.

(21) Appl. No.: 17/938,794

(22) Filed: Oct. 7, 2022

(65) Prior Publication Data

US 2024/0119149 A1 Apr. 11, 2024

(51) Int. Cl.
*G06F 21/56* (2013.01)
*G06F 21/62* (2013.01)
*G06N 5/04* (2023.01)
*G06N 20/00* (2019.01)

(52) U.S. Cl.
CPC .......... *G06F 21/56* (2013.01); *G06F 21/6218* (2013.01); *G06N 5/04* (2013.01); *G06N 20/00* (2019.01); *G06F 2221/034* (2013.01)

(58) Field of Classification Search
CPC .............. G06F 21/56; G06F 21/6218; G06F 2221/034; G06N 20/00; G06N 5/04
See application file for complete search history.

(56) References Cited

U.S. PATENT DOCUMENTS

| | | | |
|---|---|---|---|
| 9,097,542 B2 | 8/2015 | Morlock et al. | |
| 11,720,464 B1* | 8/2023 | Ezrielev | G06F 11/3006 714/47.1 |
| 12,182,670 B1 | 12/2024 | Beauchesne | |
| 2016/0226894 A1* | 8/2016 | Lee | H04L 63/1416 |
| 2019/0138423 A1 | 5/2019 | Agerstam et al. | |
| 2019/0188065 A1* | 6/2019 | Anghel | G06F 11/0778 |
| 2020/0285737 A1 | 9/2020 | Kraus | |

(Continued)

OTHER PUBLICATIONS

Pang, Guansong, et al. "Deep Learning for Anomaly Detection: A Review", ACM Comput. Surv., vol. 1, No. 1, Article 1, Jan. 2020. arXiv:2007.02500v3 [cs.LG] Dec. 5, 2020. 36 pages.

(Continued)

*Primary Examiner* — Daniel B Potratz
*Assistant Examiner* — Matthias Habtegeorgis
(74) *Attorney, Agent, or Firm* — WOMBLE BOND DICKINSON (US) LLP

(57) ABSTRACT

Methods and systems for anomaly detection in a distributed system are disclosed. To manage anomaly detection, a system may include an anomaly detector and one or more data collectors. The anomaly detector may detect anomalies in data obtained from one or more of the data collectors using an inference model. The inference model may be an autoencoder trained to reconstruct data that is intended to match input data to an extent considered acceptable by the system. To accurately perform anomaly detection, the inference model may require re-training. Data collected from the one or more data collectors may be used to re-train the inference model as needed. Following anomaly detection and/or inference model re-training, the data may be discarded to remove the data from the anomaly detector.

20 Claims, 7 Drawing Sheets

(56) References Cited

U.S. PATENT DOCUMENTS

| | | |
|---|---|---|
| 2020/0293870 A1 | 9/2020 | Isikdogan et al. |
| 2020/0334578 A1* | 10/2020 | Ikeda .................... G06N 3/045 |
| 2020/0364561 A1 | 11/2020 | Ananthanarayanan |
| 2021/0048994 A1* | 2/2021 | Yu .......................... G06F 21/57 |
| 2021/0064933 A1* | 3/2021 | Bos ........................ G06F 18/285 |
| 2021/0097433 A1 | 4/2021 | Olgiati |
| 2021/0133607 A1 | 5/2021 | Stubbs |
| 2021/0144211 A1 | 5/2021 | Schnieders |
| 2021/0182556 A1* | 6/2021 | Klug ........................ G06T 7/194 |
| 2021/0203576 A1* | 7/2021 | Padfield .............. H04L 41/5009 |
| 2022/0004921 A1* | 1/2022 | Balaraman .............. G06F 16/35 |
| 2022/0027083 A1* | 1/2022 | Zuolo ................... G06F 3/0679 |
| 2022/0030019 A1 | 1/2022 | Neuvirth |
| 2022/0171863 A1 | 6/2022 | Green |
| 2022/0172067 A1* | 6/2022 | Kang ..................... G06N 3/088 |
| 2022/0188694 A1 | 6/2022 | Suzani |
| 2022/0201490 A1 | 6/2022 | Sedjelmaci |
| 2022/0329613 A1 | 10/2022 | Abbaszadeh |
| 2022/0374677 A1 | 11/2022 | Wang et al. |
| 2022/0382622 A1* | 12/2022 | Ye ........................ G06F 11/0709 |
| 2022/0391724 A1* | 12/2022 | Yoon ........................ G06N 5/04 |
| 2022/0400121 A1 | 12/2022 | Han |
| 2022/0417274 A1 | 12/2022 | Madanahalli |
| 2023/0004863 A1 | 1/2023 | Kanishima |
| 2023/0162038 A1* | 5/2023 | Qi .......................... G06N 3/044 |
| | | 706/21 |
| 2023/0169147 A1* | 6/2023 | Sivakumar ............... G06N 5/02 |
| | | 382/159 |
| 2023/0229550 A1 | 7/2023 | Zhao |
| 2023/0289660 A1* | 9/2023 | Shi ........................ G06N 3/0455 |
| 2023/0325725 A1 | 10/2023 | Lester |
| 2023/0385456 A1 | 11/2023 | Beauregard |
| 2023/0412627 A1* | 12/2023 | Szilágyi et al. .... G06F 11/3438 |
| 2024/0046152 A1* | 2/2024 | Lehmann ................. G06N 3/09 |
| 2024/0095906 A1* | 3/2024 | Gudovskiy .......... G06V 10/454 |
| 2024/0104201 A1 | 3/2024 | Makovoz |

OTHER PUBLICATIONS

Finke, Thorben, et al. "Autoencoders for unsupervised anomaly detection in high energy physics", Institute for Theoretical Particle Physics and Cosmology (TTK), RWTH Aachen University, D-52056 Aachen, Germany. arXiv:2104.09051v1 [hep-ph] Apr. 19, 2021. 32 pages.

Nivarthi et al., "Towards Few-Shot Time Series Anomaly Detection with Temporal Attention and Dynamic Thresholding," 2023 International Conference on Machine Learning and Applications (ICMLA), p. 1444~P1450 (Year: 2023).

He et al., "Unsupervised Log Anomaly Detection Based on Pre-training", 2023 9th International Conference on Systems and Informatics (ICSAI), 6 pages (Year: 2023).

Nassif et al., "Machine Learning for Anomaly Detection: A Systematic Review", IEEE Access, 2021, vol. 9, pp. 78658-78700 (43 pages).

\* cited by examiner

SYSTEM AND METHOD FOR MEMORY-LESS ANOMALY DETECTION USING AN AUTOENCODER

FIELD

Embodiments disclosed herein relate generally to anomaly detection. More particularly, embodiments disclosed herein relate to systems and methods to reduce computing resource expenditure and increase data security while performing anomaly detection.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
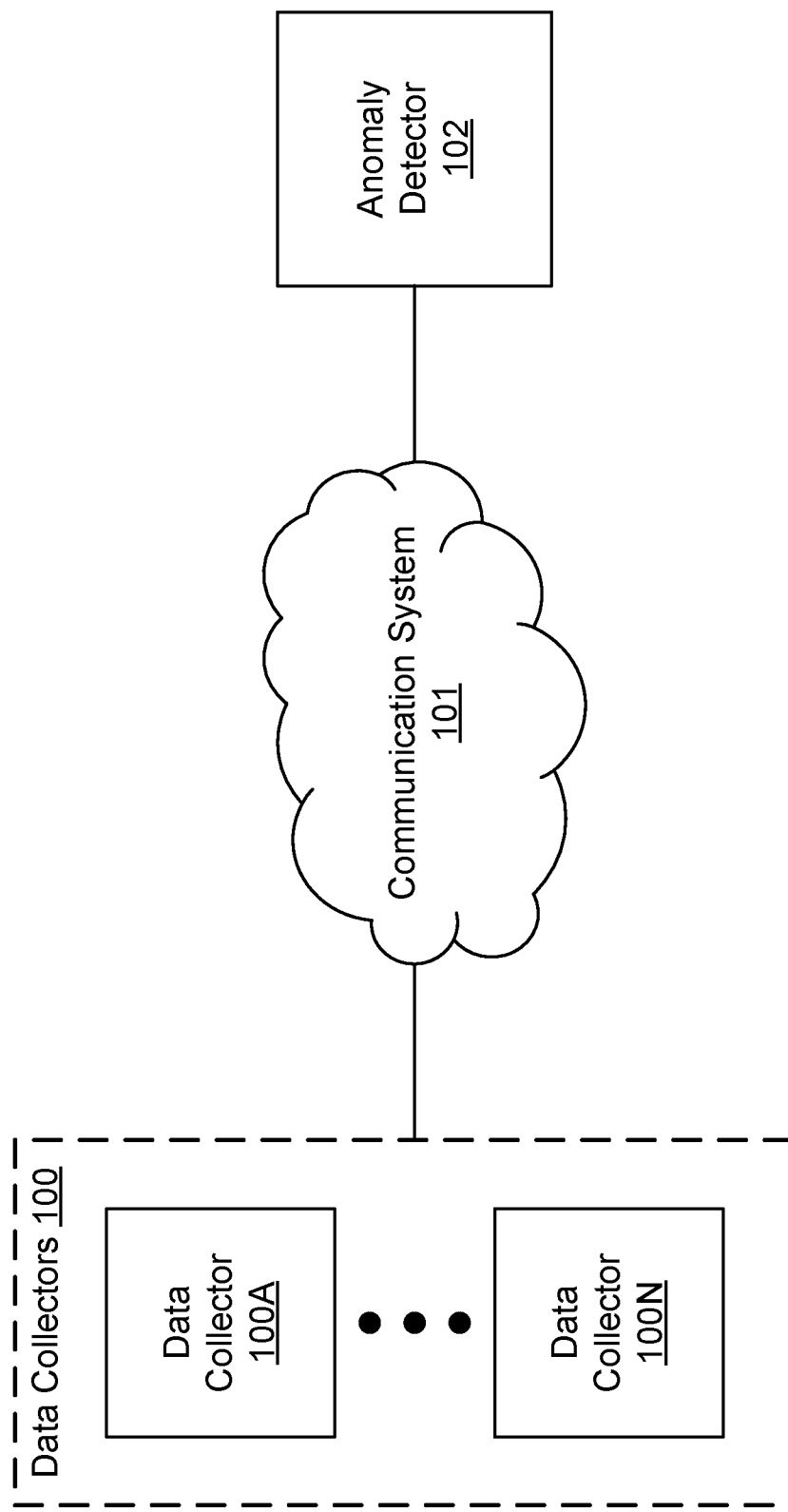
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for anomaly detection in a distributed environment using an inference model. To perform anomaly detection in a distributed environment, the system may include an anomaly detector. The anomaly detector may host and operate the inference model while re-training the inference model as needed. These operations (e.g., hosting, operating, and re-training an inference model) may require large quantities of computing resources of a device (e.g., more computing resources than desirable and/or available to the device) and may, in some embodiments, require storage of large amounts of data on the device as training data. Storing large amounts of data on the device may leave the data vulnerable to malicious attacks by unauthorized entities (e.g., attackers who desire access to the data), may prevent the device from storing other types of desirable data (e.g., due to storage space limitations), and/or may lead to other undesired outcomes.

To address any of the above issues, the anomaly detector may re-train the inference model (e.g., in an incremental fashion) and subsequently discard (e.g., remove from the device) the data used to re-train the inference model. The inference model may be implemented using an autoencoder. The autoencoder may be trained with a limited amount of training data thereby resulting in some difference between output of the autoencoder and non-anomalous data. To improve the operation of the autoencoder, the autoencoder may be retrained if the autoencoder does not generate reconstructed data with a certain degree of fidelity (e.g., has a reconstruction loss when compared to the input data above a threshold) when non-anomalous data is encountered. In addition, other data obtained from the one or more data collectors (e.g., data including anomalies and/or any other data not used to re-train the inference model) may also be discarded. By doing so, the anomaly detector may perform memory-less anomaly detection (e.g., detection of anomalies in data without maintaining significant quantities of data in any memory or storage of the device). Therefore, even in the event of an unauthorized entity (e.g., an attacker) gaining access to the device, the attacker may not access the data.

In addition, the re-training of the inference model may include a partial re-training process. Partial re-training of the inference model may include freezing (e.g., rendering unaffected by the re-training of the inference model) portions of the inference model. By doing so, only portions of the inference model not included in the frozen portion may be modified during the re-training process. Partial re-training of the inference model may utilize fewer computing resources (e.g., by only re-training a portion of the inference model rather than the entire inference model).

To perform memory-less anomaly detection, the anomaly detector may obtain data from one or more data collectors within a distributed environment. The anomaly detector may determine whether the data includes an anomaly using the inference model. The inference model may be an autoencoder trained to generate reconstructed data (within some established range for acceptable reconstruction loss) as output data when non-anomalous data is used as input data. To determine if the data includes an anomaly, the autoencoder may generate reconstructed data using the data as input, the reconstructed data being intended to match the data when the data is not anomalous. The autoencoder may then determine a reconstruction loss for the reconstructed data, the reconstruction loss measuring a degree of deviation of the reconstructed data from the data. If the reconstruction loss is above an anomaly threshold, the data may be classified as anomalous data and a process may be initiated (e.g., an action set including notifying a downstream consumer that the data includes anomalous data). The process may include discarding the data following performance of the action set.

If the reconstruction loss is within the anomaly threshold, the data may not include anomalous data. However, the data may be used to determine whether the inference model requires re-training. The inference model may require re-training if the reconstruction loss falls outside a calibration threshold for the inference model. A reconstruction loss that falls outside the calibration threshold may indicate that the inference model no longer generates acceptable reconstructed data when non-anomalous data is used as input data. In this example, the autoencoder may no longer comply with the needs of the downstream consumer. The data may then be treated as training data and used to re-train (through the partial re-training process described above) the inference model to obtain an updated inference model. The updated inference model may be more likely to reconstruct data with a lower deviation from the data and, therefore, a lower reconstruction loss when the data is non-anomalous than the inference model. As discussed above, all data (data used to re-train the inference model or otherwise) may be discarded to increase data security.

Thus, embodiments disclosed herein may provide an improved system for performing anomaly detection while securing data desired by attackers and minimizing computing resource expenditure on devices within a distributed environment. The system may improve data security on devices by not locally storing any data, thereby rendering the data unavailable to attackers. In addition, the device hosting the inference model may perform a partial re-training process (when re-training is needed) and, therefore, may not update the entire inference model. By doing so, fewer computing resources may be required to host, operate, and update the inference model on the device.

In an embodiment, a method of processing data in a distributed environment using a continuously updated inference model that is continuously updated incrementally as new portions of non-anomalous data are identified is provided.

The method may include obtaining, by an anomaly detector of the distributed environment, data from a data collector; obtaining, by the anomaly detector, reconstructed data using the continuously updated inference model and the data, the reconstructed data being intended to match the data when the data is not anomalous; making a first determination, by the anomaly detector, regarding whether the data is anomalous, the first determination being based at least in part on the reconstructed data; in a first instance of the first determination where the data is anomalous, initiating a process based on the data being anomalous.

The method may also include: in a second instance of the first determination where the data is not anomalous: making a second determination, by the anomaly detector, regarding whether the data is useful to improve anomaly detection capabilities of the continuously updated inference model through training; in a first instance of the second determination where the data is useful, re-training, by the anomaly detector, the continuously updated inference model using the data as training data to obtain an updated inference model and discarding the data; and in a second instance of the second determination where the data is not useful, discarding the data without using the data for inference model updating purposes.

Making the first determination may also include: obtaining a reconstruction loss, the reconstruction loss being based on the data and the reconstructed data; making a third determination regarding whether the reconstruction loss is within an anomaly threshold; in a first instance of the third determination where the reconstruction loss is within an anomaly threshold, classifying the data as not anomalous; and in a second instance of the third determination where the reconstruction loss is not within an anomaly threshold, classifying the data as anomalous.

The continuously updated inference model may be an autoencoder and the reconstructed data may be an output of the autoencoder.

The reconstruction loss may measure a deviation of the reconstructed data from the data, with the reconstruction loss increasing as the deviation increases.

Making the second determination may also include: making a fourth determination regarding whether the reconstruction loss is within a calibration threshold for the continuously updated inference model; in a first instance of the fourth determination where the reconstruction loss is within a calibration threshold, classifying the data as not useful; and in a second instance of the fourth determination where the reconstruction loss is outside the calibration threshold, classifying the data as useful.

The anomaly threshold may define a first range of values of the reconstruction loss, the calibration threshold may define a second range of values of the reconstruction loss, and the values of the reconstruction loss within the first range may be larger than the values of the reconstruction loss within the second range.

Using the data for inference model updating purposes may also include: treating the data as training data; and re-training the continuously updated inference model using the training data to obtain an updated inference model, the updated inference model being more likely to reconstruct data with a lower deviation from the data than the continuously updated inference model.

Re-training the continuously updated inference model may include: freezing a portion of the continuously updated inference model prior to re-training the continuously updated inference model to obtain a frozen portion of the continuously updated inference model, and modifying portions of the continuously updated inference model that are not part of the frozen portion of the continuously updated inference model based on the data to obtain the updated inference model.

Freezing the portion of the continuously updated inference model may render the frozen portion of the continuously updated inference model unaffected by the re-training of the continuously updated inference model.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer-implemented services may include any type and quantity of computer implemented services. For example, the computer-implemented services may include monitoring services (e.g., of locations), communication services, and/or any other type of computer-implemented services.

To provide memory-less anomaly detection services, the system may include anomaly detector 102. Anomaly detector 102 may provide all, or a portion of, the computer-implemented services. For example, anomaly detector 102 may provide computer-implemented services to users of anomaly detector 102 and/or other computing devices operably connected to anomaly detector 102. The computer-implemented services may include any type and quantity of services including, for example, memory-less anomaly detection.

To facilitate memory-less anomaly detection, the system may include one or more data collectors 100. Data collectors 100 may include any number of data collectors (e.g., 100A-100N). For example, data collectors 100 may include one data collector (e.g., 100A) or multiple data collectors (e.g., 100A-100N) that may independently and/or cooperatively facilitate the memory-less anomaly detection.

All, or a portion, of the data collectors 100 may provide (and/or participate in and/or support the) computer-implemented services to various computing devices operably connected to data collectors 100.

The computer-implemented services may include any type and quantity of services including, for example, memory-less anomaly detection in a distributed environment. Different data collectors may provide similar and/or different computer-implemented services.

When providing the computer-implemented services, the system of FIG. 1 may ascertain whether collected data is anomalous. To do so, the system of FIG. 1 may utilize an inference model. The inference model may be an autoencoder that generates reconstructed data usable to ascertain whether data is anomalous.

However, the quality of the computer-implemented services may depend on how well the system of FIG. 1 is able to ascertain whether data is anomalous, which may depend on the ability of the autoencoder to faithfully reconstruct non-anomalous data (e.g., generate reconstructed data based on non-anomalous data with a reconstruction loss considered acceptable according to the needs of the system). When encountering new non-anomalous data, the autoencoder may generate reconstructed data with a higher deviation from the data (e.g., a higher reconstruction loss) than the reconstructed data based on non-anomalous data used to train (and/or otherwise previously encountered by) the autoencoder. To improve the anomaly detection capabilities of the autoencoder (so it is able to identify new non-anomalous data as non-anomalous), the inference model may be re-trained to obtain an updated inference model. However, hosting, operating, and re-training of the inference model may consume large quantities of computing resources (e.g., more computing resources than desirable for use by the device), may require large amounts of data to be stored on a device (e.g., training data and/or other data), and storing large amounts of data on the device may also leave the data vulnerable to malicious attacks by third parties (e.g., attackers who desire access to the data).

In general, embodiments disclosed herein may provide methods, systems, and/or devices for minimizing computing resource expenditure by devices in a distributed environment while performing anomaly detection and continuously updating inference models usable for the anomaly detection. To reduce computing resource expenditure during anomaly detection in data (and/or protect data from malicious attackers that may attempt to compromise devices storing copies of the data), the system of FIG. 1 may implement an inference model update framework and anomaly detection framework that allows (i) small amounts of data to be used for training and discarded thereby not requiring large amounts of data to be aggregated for training purposes, and (ii) data processed for anomaly detection purposes to be discarded after processing likewise reducing the amount of data subject to compromise by malicious attackers.

In addition, the inference model update framework may update inference models through a partial re-training process. Partial re-training of the inference model may utilize fewer computing resources (e.g., by only re-training a portion of the inference model rather than the entire inference model) than a complete re-training process.

To provide the above noted functionality, the system of FIG. 1 may include anomaly detector 102. Anomaly detector 102 may (i) determine whether data (e.g., obtained from data collectors 100 and/or by itself) includes anomalous data using an inference model, (ii) when non-anomalous data is identified, determine whether the non-anomalous data may be used to improve the accuracy of the inference model through re-training, (iii) when the non-anomalous data is determined as being usable to improve the accuracy of the inference model, obtain an updated inference model using the non-anomalous data, and/or (iv) discard the data after its use so that the data is not available to malicious attackers if anomaly detector 102 is compromised.

Figure 3A:
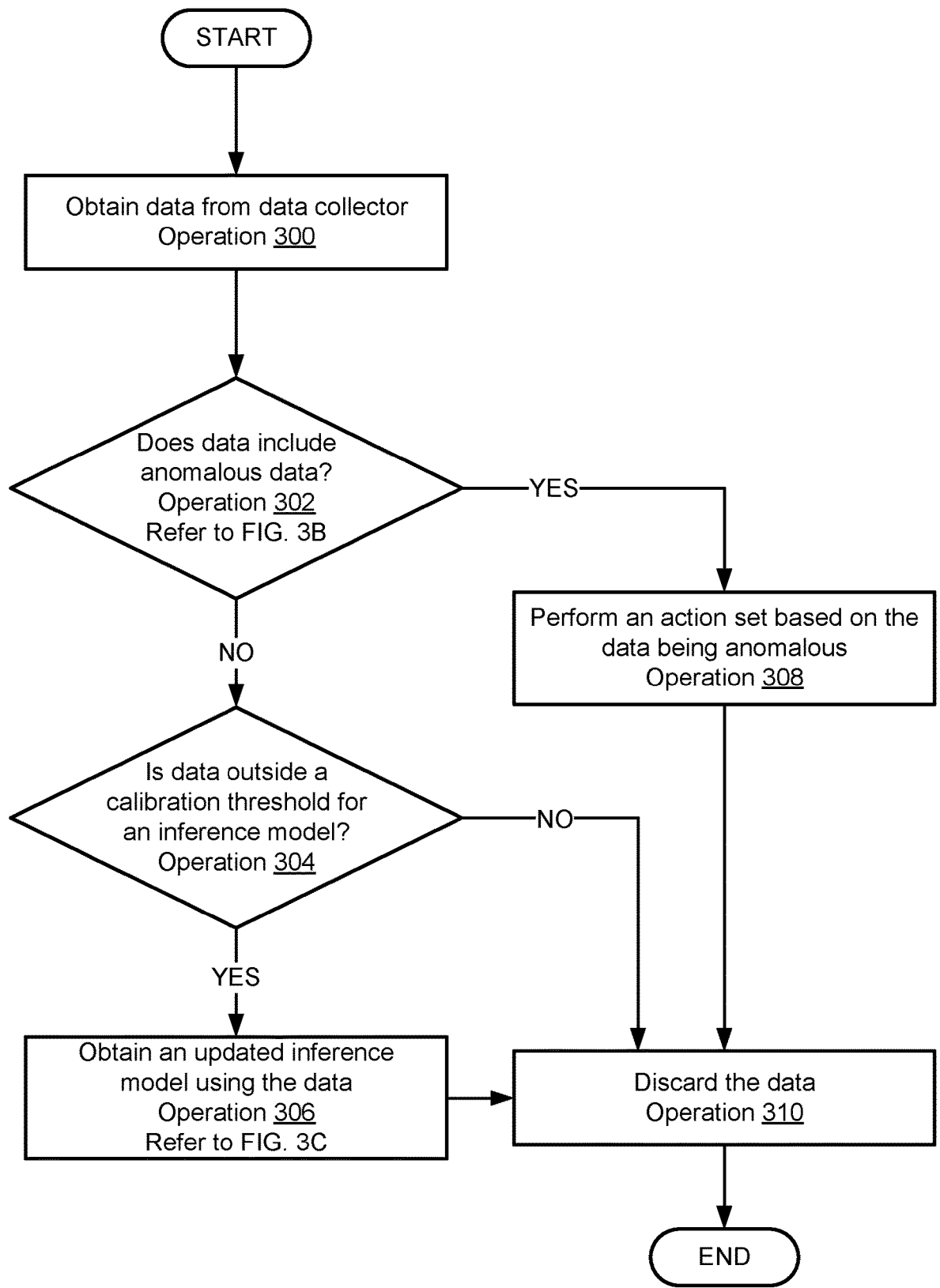
FIG. 3A shows a flow diagram illustrating a method of anomaly detection using an inference model in accordance with an embodiment.
Figure 3B:
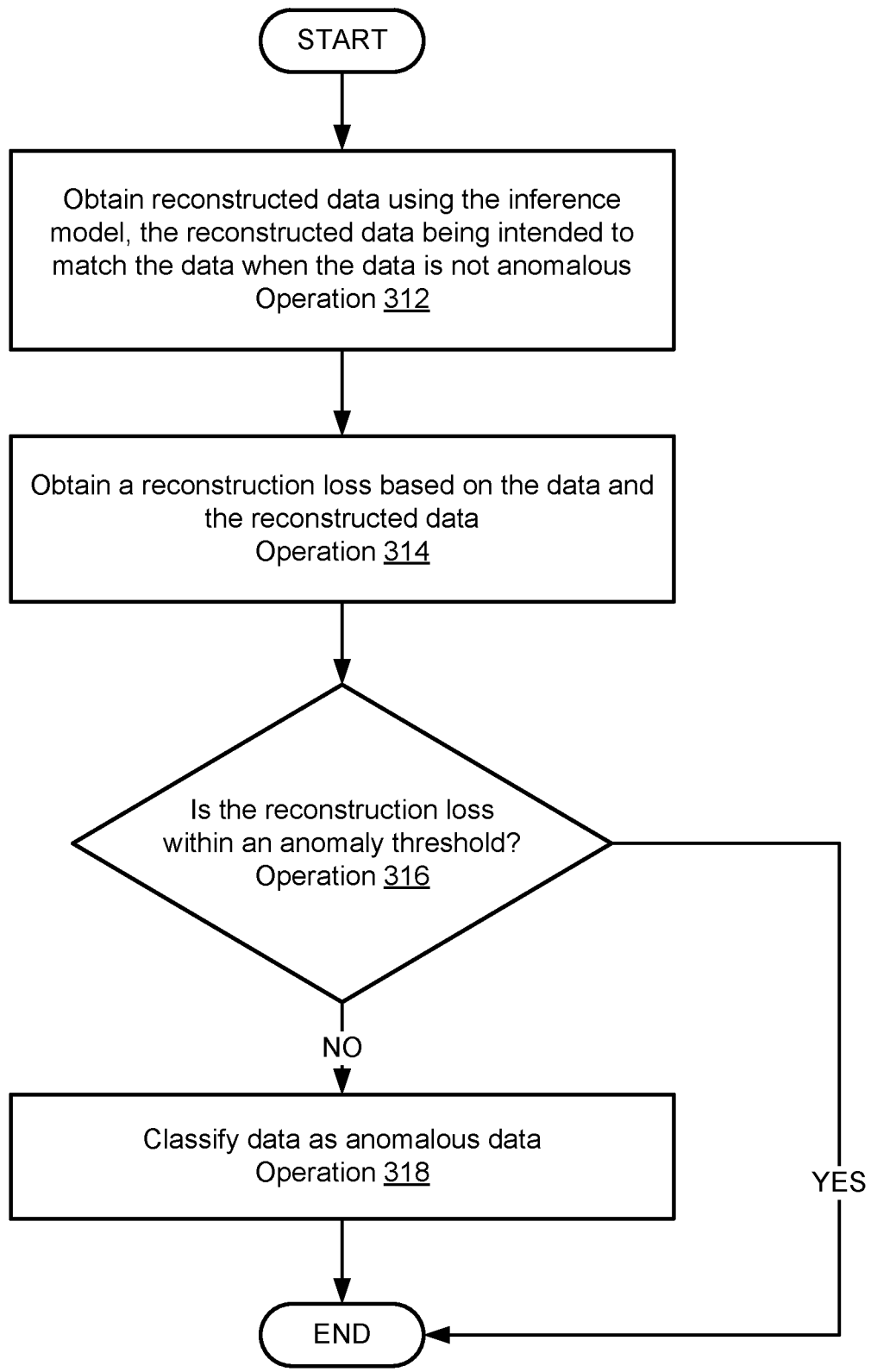
FIG. 3B shows a flow diagram illustrating a method of identifying anomalous data in accordance with an embodiment.
Figure 3C:
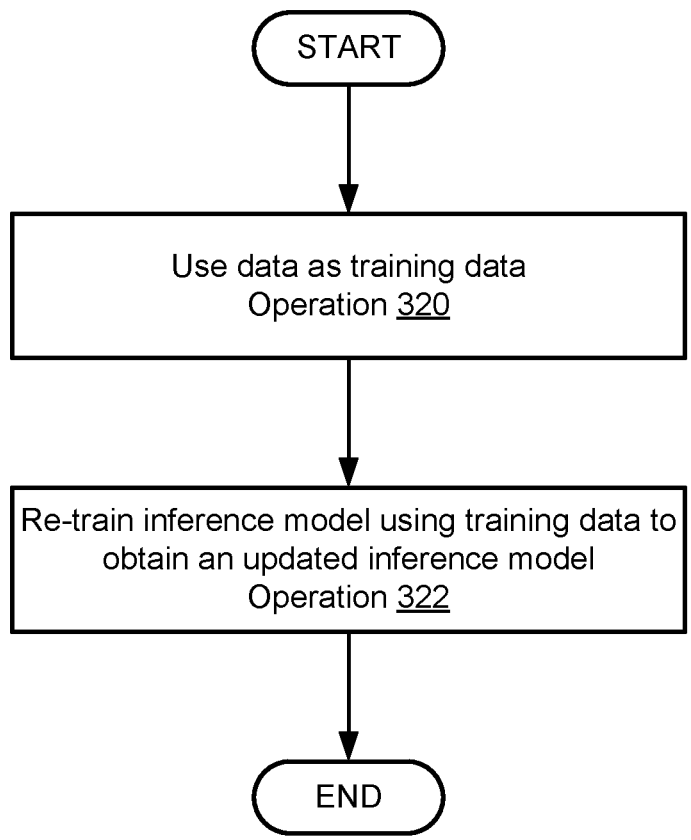
FIG. 3C shows a flow diagram illustrating a method of determining whether data is useful to improve an inference model through re-training in accordance with an embodiment.

When performing its functionality, anomaly detector 102 and/or data collectors 100 may perform all, or a portion, of the methods and/or actions shown in FIGS. 3A-3C.

Data collectors 100 and/or anomaly detector 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data collectors 100 and/or anomaly detector 102 are implemented using an internet of things (IoT) device, which may include a computing device. The IoT device may operate in accordance with a communication model and/or management model known to the anomaly detector 102, other data collectors, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

Figure 2:
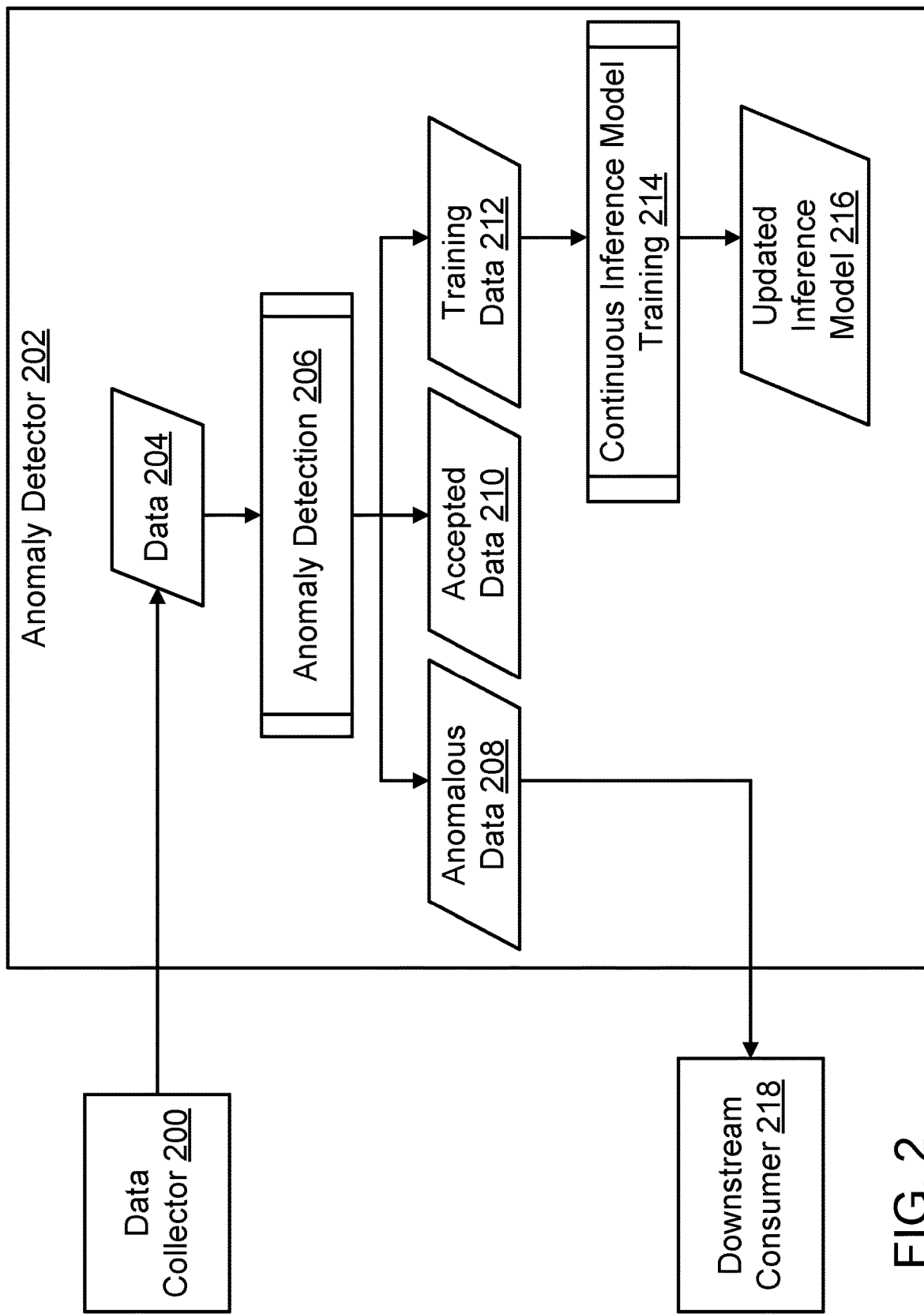
FIG. 2 shows a block diagram illustrating an anomaly detector over time in accordance with an embodiment.

To further clarify embodiments disclosed herein, diagrams illustrating data flows and/or processes performed in a system in accordance with an embodiment are shown in FIG. 2.

FIG. 2 shows a diagram of anomaly detector 202 interacting with data collector 200 and downstream consumer 218. Anomaly detector 202 may be similar to anomaly detector 102 shown in FIG. 1. In FIG. 2, anomaly detector 202 may be connected to data collector 200 and downstream consumer 218 via a communication system (not shown). Data collector 200 may be similar to any of data collectors 100. Communications between anomaly detector 202, data collector 200, and downstream consumer 218 are illustrated using lines terminating in arrows. In some embodiments, downstream consumer 218 may not be required.

As discussed above, anomaly detector 202 may perform computer-implemented services by processing data (e.g., via memory-less anomaly detection) in a distributed environment in which devices may be subject to malicious attacks.

To perform memory-less anomaly detection in the distributed environment, anomaly detector 202 may obtain data 204 from data collector 200. Data 204 may include any type and quantity of data. Anomaly detector 202 may perform anomaly detection 206 process on data 204 to determine whether data 204 includes anomalous data. Anomaly detection 206 process may include generating an inference (e.g., reconstructed data) using an inference model (e.g., an auto-encoder) trained to reconstruct data 204. Therefore, the reconstructed data may be intended to be a faithful (to an extent considered acceptable by the system) reconstruction of data 204 when data 204 is not anomalous. Anomaly detector 202 may generate a reconstruction loss. The reconstruction loss may be based on the reconstructed data and data 204. The reconstruction loss may be compared to an anomaly threshold. The anomaly threshold may indicate a first range of values of the reconstruction loss. Any reconstruction loss outside the anomaly threshold may indicate that the reconstructed data does not match data 204 to an extent considered acceptable by the system and, therefore, includes anomalous data. Any reconstruction loss within the anomaly threshold may indicate that the data does not include anomalous data. The anomaly threshold may be set by a downstream consumer 218, and any data with a reconstruction loss outside the anomaly threshold may be considered unacceptable for the needs of downstream consumer 218. Therefore, downstream consumer 218 may desire to be notified of any anomalies in collected data. In some embodiments, anomaly detector 202 may respond directly to any anomalies and downstream consumer 218 may not be included in the system. Anomaly detector 202 may take different actions with respect to data 204 depending on whether data 204 includes anomalous data.

In a first example of the actions that anomaly detector 202 may take, consider a scenario in which the reconstruction loss is outside the anomaly threshold and, therefore, may include anomalous data 208. When data 204 is classified as anomalous data 208, anomaly detector 202 may initiate performance of an action set. The action set may include sending the anomalous data 208 (and/or a notification of the presence of anomalies in data 204) to downstream consumer 218. By doing so, downstream consumer 218 may be notified of the existence of anomalous data 208 and may perform actions in response to this notification. Alternatively, anomaly detector 202 may perform the action set based on the presence of anomalous data 208. In this example, downstream consumer 218 may or may not be included in the system. Following this action set, anomalous data 208 may be discarded, transmitted to another device, and/or otherwise removed from anomaly detector 202. By doing so, anomalous data 208 may not be available to malicious attackers if anomaly detector 202 is compromised.

In a second example of the actions that anomaly detector 202 may take, consider a scenario in which the reconstruction loss is within the anomaly threshold. When data 204 is classified as not including anomalous data, anomaly detector 202 may elect to use data 204 for training purposes if useful for training. To ascertain whether data 204 is useful for training, the reconstruction loss may be compared to a calibration threshold. The calibration threshold may indicate a second range of values of the reconstruction loss. Any reconstruction loss outside the calibration threshold may indicate that data 204 is useful for training purposes and may be classified as training data 212. Any reconstruction loss within the calibration threshold may indicate that data 204 is not useful for training purposes.

Continuing with the second example, if the reconstruction loss is within the calibration threshold, then data 204 may be classified as accepted data 210. Accepted data 210 may be treated as not including anomalies and not useful for training (at least with respect to the level of improvement in the inference model that could be attained by training using accepted data 210 when weighed against the computing resource cost for the training). Accepted data 210 may be discarded, transmitted to another device, and/or otherwise removed from anomaly detector 202 so that, like anomalous data 208, accepted data 210 may not be available to malicious attackers should anomaly detector 202 be compromised.

When identified, training data 212 may be used for a continuous inference model training 214 process. Continuous inference model training 214 process may include a partial re-training of the inference model. Partial re-training of the inference model may include freezing (e.g., rendering unaffected by the re-training) a portion of the inference model. Therefore, only portions of the inference model not included in the frozen portion of the inference model may be modified during re-training. Partial re-training of the inference model may consume fewer computing resources than a complete re-training of the inference model, may reduce large changes in decisions boundaries of the inference model, and may facilitate discarding of data on a piece meal basis (e.g., by avoiding the need for establishing large training data sets through aggregation of large amounts of data that may be valued by a malicious attacker).

Continuous inference model training 214 process may generate an updated inference model 216 (e.g., by modifying the structure of the inference model). Updated inference model 216 may be used to generate reconstructed data based on data from data collector 200. Following continuous inference model training 214 process, training data 212 may be discarded, transmitted to another device, and/or otherwise removed from anomaly detector 202 so that training data 212 may not be available to malicious attackers through compromise of anomaly detector 202.

By discarding all data (e.g., anomalous data 208, accepted data 210, and training data 212), no data may be stored on anomaly detector 202 for any significant duration of time. Therefore, malicious attackers attempting to compromise anomaly detector 202 may not be able to access any significant quantity of data in the event of an attack. Therefore, anomaly detection may be performed by anomaly detector 202 with improved security through continuous inference model updating and discarding of the training data. In addition, by only performing partial re-training of the inference model, fewer computing resources may be consumed to update the inference model.

In an embodiment, anomaly detector 202 is implemented using a processor adapted to execute computing code stored on a persistent storage that when executed by the processor performs the functionality of anomaly detector 202 discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1 may perform various methods to perform anomaly detection in a distributed environment in which devices may be subject to malicious attacks. FIGS. 3A-3C illustrate methods that may be performed by the components of FIG. 1. In the diagrams discussed below and shown in FIGS. 3A-3C, any of the operations may be repeated, performed in different orders, and/or performed in parallel with or in a partially overlapping in time manner with other operations.

Turning to FIG. 3A, a flow diagram illustrating a method of anomaly detection using an inference model in accordance with an embodiment is shown. The method may be performed, for example, by an anomaly detector, a data collector, and/or another device.

At operation 300, data is obtained from a data collector. The data collector may be any device (e.g., a data processing system) that collects data. For example, the data collector may include a sensor that collects data (e.g., temperature data, humidity data, or the like) representative of an ambient environment, a camera that collects images and/or video recordings of an environment, and/or any other type of component that may collect information about an environment or other source.

The obtained data may include the live data (e.g., temperature readings, video recordings, etc.), aggregated statistics and/or other representation of the data (e.g., an average temperature, portions of the video, etc.) to avoid transmitting large quantities of data over communication system 101, and/or any other types of information.

The data may be obtained from data collectors 100 continuously, at regular intervals, in response to a request from anomaly detector 102, and/or in accordance with any other type of data collection scheme. For example, data collector 100A may include a camera that records continuous video of a property. The owners of the property may wish to be notified if any persons appear on the property outside the hours of 7:00 AM to 7:00 PM. Therefore, the video recordings collected during the hours of 7:00 PM to 7:00 AM may be selected by the data collector and transmitted to the anomaly detector for anomaly detection (e.g., identification of persons on the property outside the accepted times of 7:00 AM to 7:00 PM). The video recordings may be transmitted, for example, once per day after the time period has elapsed (e.g., at 7:00 AM). Following receipt of the data, the anomaly detector 102 may determine whether the data includes anomalous data as described below.

At operation 302, the anomaly detector 102 determines whether the data includes anomalous data. The anomaly detector 102 may determine whether the data includes anomalous data using the data and an inference (e.g., reconstructed data) generated by an inference model (e.g., an autoencoder). Anomalous data may be data that deviates from typical data by a certain degree. Anomalous data may include, for example, an identification of a person at a particular location where non-anomalous data indicates no person should be located. For additional details regarding anomaly detection, refer to FIG. 3B.

If the data includes anomalous data, the method may proceed to operation 308. If the data does include anomalous data, the method may proceed to operation 304.

At operation 308, an action set is performed based on the data being anomalous. The action set may include notifying a downstream consumer that the data may include anomalous data. The downstream consumer may be any entity desiring to be notified of anomalies in the data collected by the data collector. For example, the downstream consumer may be the owner of the property, a security team, and/or any other entity that may respond to the presence of anomalous data in the data. The downstream consumer may be notified by sending one or more messages (e.g., an email alert, a text message alert, an alert through an application on a device) to the downstream consumer. The messages may include information (e.g., that the data is anomalous) regarding the data, a copy of the data itself, and/or other information. Other actions (e.g., initiating an alarm, automatically shutting a security door, and/or other processes) may be performed when anomalous data is identified without departing from embodiments disclosed herein. Alternatively, the downstream consumer may be the anomaly detector 102 itself, and the anomaly detector 102 may take action in response to the anomaly without notifying an additional entity of the presence of the anomaly.

At operation 310, the data is discarded. The data may be discarded to secure against data being accessed by a malicious attacker attempting to compromise an anomaly detector. The data may be discarded immediately following the action set described in operation 308, and/or may be discarded after a previously determined duration of time (e.g., twice per day, etc.).

Discarding data may include deleting the data, transmitting the data to a device at an offsite location to be archived, and/or transmitting the data to another device for other purposes (in net, resulting in no copies of the data being retained on the anomaly detector). The data may be discarded via other methods without departing from embodiments disclosed herein. By doing so, any unauthorized entity (e.g., a malicious attacker) gaining access to the anomaly detector 102 via a malicious attack would not be able to access any data (e.g., due to the data not being stored in any memory or storage on the compromised device).

Returning to operation 302, the method may proceed to operation 304 if the data does not include anomalous data. If the data does not include anomalous data, the data may (or may not) be useful to evaluate and/or improve the anomaly detection capabilities of the inference model through training, as described below.

At operation 304, it is determined whether the reconstruction loss is outside a calibration threshold for an autoencoder used to generate the reconstructed data to evaluate whether the data includes anomalous data in operation 302. A reconstruction loss within the calibration threshold may indicate that the autoencoder reconstructs data to an extent considered acceptable by the system. A reconstruction loss within the calibration threshold may indicate, for example, that the autoencoder meets the requirements of a downstream consumer. A reconstruction loss outside the calibration threshold (but that is not anomalous) may indicate that the autoencoder may be improved using the data to a significant enough degree that it outweighs the computing resource cost for updating the autoencoder. If the reconstruction loss is within the calibration threshold, the autoencoder may not use the data for training, and the data may be discarded as described with respect to operation 310 below. If the reconstruction loss is outside the calibration threshold, the method may proceed to operation 306 and the data may be used for training to obtain an updated inference model. Refer to FIG. 2 for additional details regarding the calibration threshold.

At operation 306, an updated inference model (e.g., updated autoencoder) is obtained using the data. To obtain an updated inference model, the anomaly detector may treat the data as training data and may re-train the inference model to obtain the updated inference model. The re-training may be partial re-training where only the data is used to update the inference model. The updated inference model may be more likely to reconstruct data with a lower deviation from the data than the inference model. Following re-training of the inference model, the data may be discarded as described with respect to operation 310. Refer to FIG. 3C for additional details regarding obtaining an updated inference model.

The method may end following operation 310.

Using the method illustrated in FIG. 3A, a system in accordance with embodiments disclosed herein may provide for anomaly detection with a continuously updated inference model while reducing the risk of undesired disclosure of data to malicious attackers.

Turning to FIG. 3B, a flow diagram illustrating a method of identifying anomalous data in accordance with an embodiment is shown. The operations in FIG. 3B may be an expansion of operation 302 in FIG. 3A.

At operation 312, reconstructed data is obtained using an inference model. The reconstructed data may be intended to match the data when the data is not anomalous (or match within a certain degree, there may be some difference between the reconstructed data and the data without the data being anomalous). The inference model may be, for example, an autoencoder (e.g., a neural network) trained to identify anomalies in data obtained from data collectors 100. The inference model may be trained using anomaly detection training data (not shown) to obtain an initially trained model. Anomaly detection training data may include a labeled dataset of data (e.g., including non-anomalous data) or may be unlabeled. For example, the anomaly detection training data may include frames of a video recording displaying a view of the property with no person present during certain times of the day and frames of the video recording displaying a few persons present during other times of the day. These frames may be labeled as including an expected number of persons within the frames (some or none depending on the frames). Therefore, the inference model may be trained to faithfully reconstruct data when the data is non-anomalous (e.g., video frames that include a few persons or no persons, depending on the time of the day). In this example, the inference model may generate a reconstructed image intended to match a frame of the video recording. The reconstructed data may be used in conjunction with the data to determine whether an anomaly is present in the data as described below.

At operation 314, a reconstruction loss is obtained based on the data and the reconstructed data. The reconstruction loss may measure a deviation of the reconstructed data from the data, with the reconstruction loss increasing as the deviation increases. The reconstruction loss may be represented, for example, as a difference (e.g., an $L^2$ norm) between the data used as input data and the reconstructed data generated as output data by the autoencoder. If the reconstructed data includes a reconstructed image, the reconstruction loss may be calculated by comparing, pixel by pixel, the original image to the reconstructed image. Differences in light, color, sharpness, and/or other differences may be discerned from the comparison and used to calculate an overall percent difference between the two images.

At operation 316, it is determined whether the reconstruction loss falls within an anomaly threshold. The anomaly threshold may define a first range of values of the reconstruction loss. If the reconstruction loss is within the anomaly threshold, the reconstruction loss may not be considered large enough to indicate an anomaly. However, if the reconstruction loss is outside the anomaly threshold, the reconstruction loss may be considered too large to be non-anomalous and the data may be classified as anomalous, as shown in operation 318. For example, a frame of a video recording showing a person on the property may have a large enough reconstruction loss from the reconstructed data (e.g., a reconstruction of the frame of the video recording by the autoencoder) to be classified as an anomaly.

If it is determined that the reconstruction loss falls within the anomaly threshold, then the method may end following operation 316. If not, the method may proceed to operation 318.

At operation 318, the data may be classified as anomalous data. Data may be classified as anomalous data by, for example, labeling (e.g., flagging) the data as being anomalous, initiating performance of various actions in response to the data being classified as being anomalous, and/or via other methods.

The method may end following operation 318.

Turning to FIG. 3C, a flow diagram illustrating a method of determining whether data is useful to improve accuracy of an inference model through re-training in accordance with an embodiment is shown. The operations in FIG. 3C may be an expansion of operation 306 in FIG. 3A.

At operation 320, the data may be used as training data. The data may be used as training data by labeling it as training data for ingest into a training process for an inference model.

At operation 322, the inference model is re-trained to obtain an updated inference model. The inference model may be retrained using a partial re-training process. The partial re-training process may include freezing (e.g., rendering unaffected by the re-training process) a portion of the inference model. The frozen portion may be chosen randomly during each instance of re-training. The size of the frozen portion may be selected via any method (e.g., heuristically, deterministically based on characteristics of the inference model such as size, accuracy level, etc.). For example, the anomaly detector 102 may freeze a random 75% of the inference model during each re-training process. Therefore, only the portion of the inference model not included in the frozen portion (e.g., the remaining 25% in this example) may be modified during re-training of the inference model.

In an embodiment, the inference model is re-trained by (i) freezing some of the parameters of a neural network (e.g., weights of connections between neurons), (i) establishing an objective function that optimizes for the machine learning model to output the data for a given input, and (ii) iteratively modifying the parameters that are not frozen until the objective function is optimized. The re-training may be performed via other methods without departing from embodiments disclosed herein.

Re-training the inference model may generate an updated inference model. The updated inference model may be used in place of the inference model and no copies of the inference model may be retained on the anomaly detector 102. By doing so, storage resources may be freed (e.g., by not retaining old copies of inference models) and the most up-to-date version of the inference model may be the only version of the inference model available for use. Therefore, the anomaly detection capabilities of the inference model may be continuously improved by anomaly detector 102 during collection of data and detection of anomalies in the data.

The method may end following operation 322.

Figure 4:
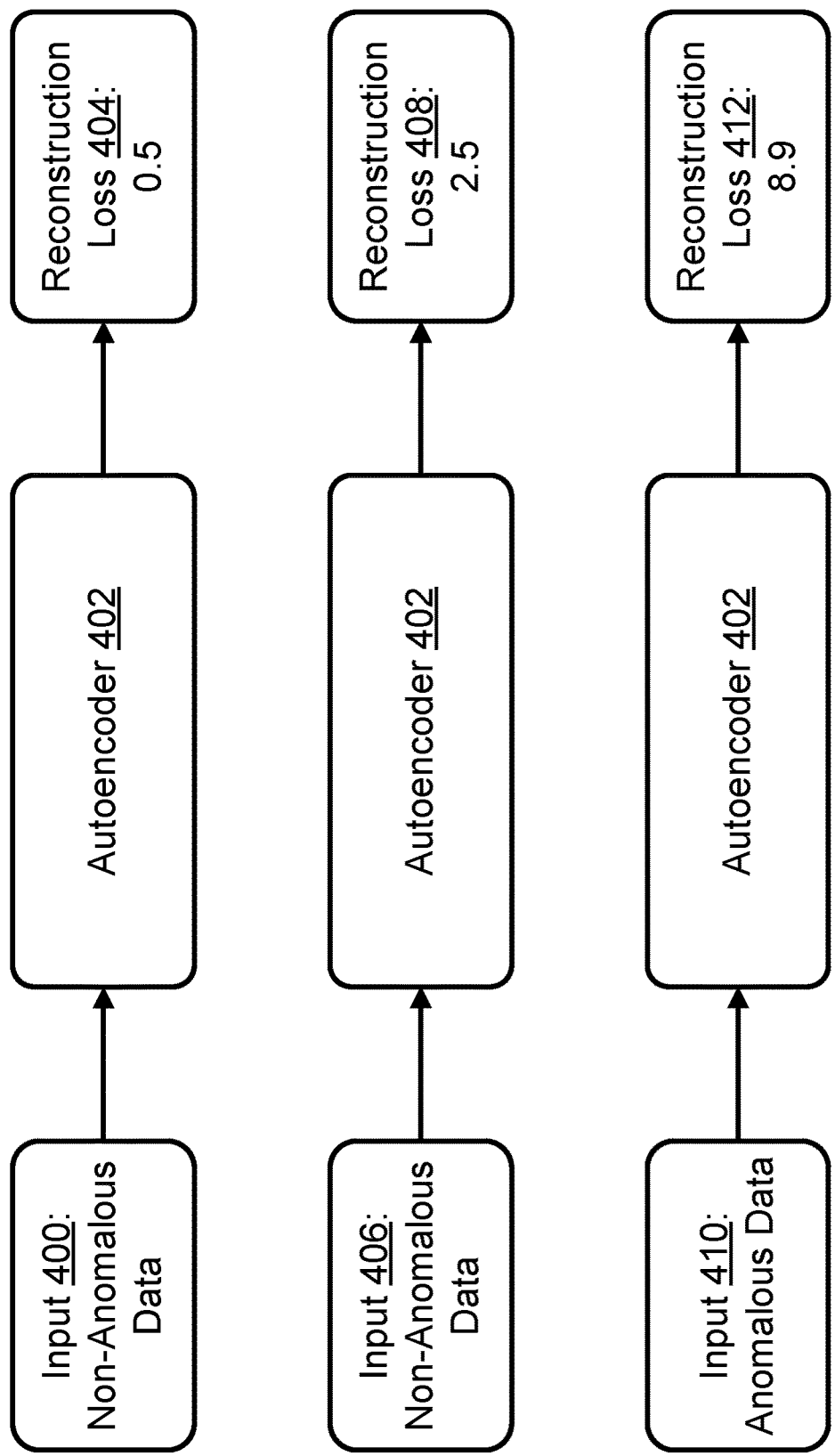
FIG. 4 shows an example autoencoder in accordance with an embodiment.

Turning to FIG. 4, three examples are shown of reconstructed data being generated based on input data using an autoencoder (autoencoder 402). In these examples, autoencoder 402 is trained to reconstruct non-anomalous input data as reconstructed data (e.g., output data) to an extent considered acceptable by the system (e.g., a downstream consumer, another entity, etc.). An anomaly threshold may be implemented to determine whether the data includes anomalous data. In this example, the anomaly threshold may be a magnitude of a reconstruction loss of 6 between the reconstructed data and the data. Therefore, any non-anomalous data used as an ingest for autoencoder 402 will likely generate reconstructed data with a reconstruction loss (e.g., a difference between the data and the reconstructed data) at or below 6, depending on how well the training data used to train the autoencoder 402 covers the full range of non-anomalous ingest data.

In a first example (the topmost section of FIG. 4), input 400 includes non-anomalous data. The non-anomalous data is treated as the ingest for autoencoder 402 and the reconstructed data produced by the autoencoder 402 has a reconstruction loss 404 of 0.5. Therefore, in this first example, autoencoder 402 classifies input 400 as including non-anomalous data.

In a second example (the middle section of FIG. 4), input 406 includes non-anomalous data. However, input 406 may include data never before seen by autoencoder 402 (during training or otherwise). Therefore, even though the input 406 includes non-anomalous data, the autoencoder 402 generates reconstructed data with a reconstruction loss 408 of 2.5. As this reconstruction loss is within the anomaly threshold of 6, autoencoder 402 may determine that input 406 does not include anomalous data. However, autoencoder 402 may compare this reconstruction loss 408 to a calibration threshold for the autoencoder. The calibration threshold may indicate that any reconstruction loss of 2-5.9 may indicate that the input data is non-anomalous but useful for re-training the autoencoder (to train autoencoder 402 to recognize non-anomalous data in potentially new situations and/or environments). In addition, reconstruction losses between 0-1.9 may indicate data is non-anomalous and not useful for re-training in accordance with the current training of the autoencoder 402. Therefore, the anomaly detector hosting autoencoder 402 (not shown) may choose to re-train autoencoder 402 using data included in input 406.

In a third example (the lowest section of FIG. 4), input 410 includes anomalous data. The anomalous data is treated as the ingest for autoencoder 402 and autoencoder 402 generates reconstructed data with a reconstruction loss 412 of 8.9. The autoencoder 402 may compare reconstruction loss 412 to the anomaly threshold and may determine that reconstruction loss 412 indicates that input 410 includes anomalous data (e.g., via being outside the anomaly threshold of 6). The anomaly detector may perform an action set based on the anomalous data, may inform a downstream consumer of the anomalous data, and/or may perform other actions as needed to address the presence of anomalous data in input 410.

Figure 5:
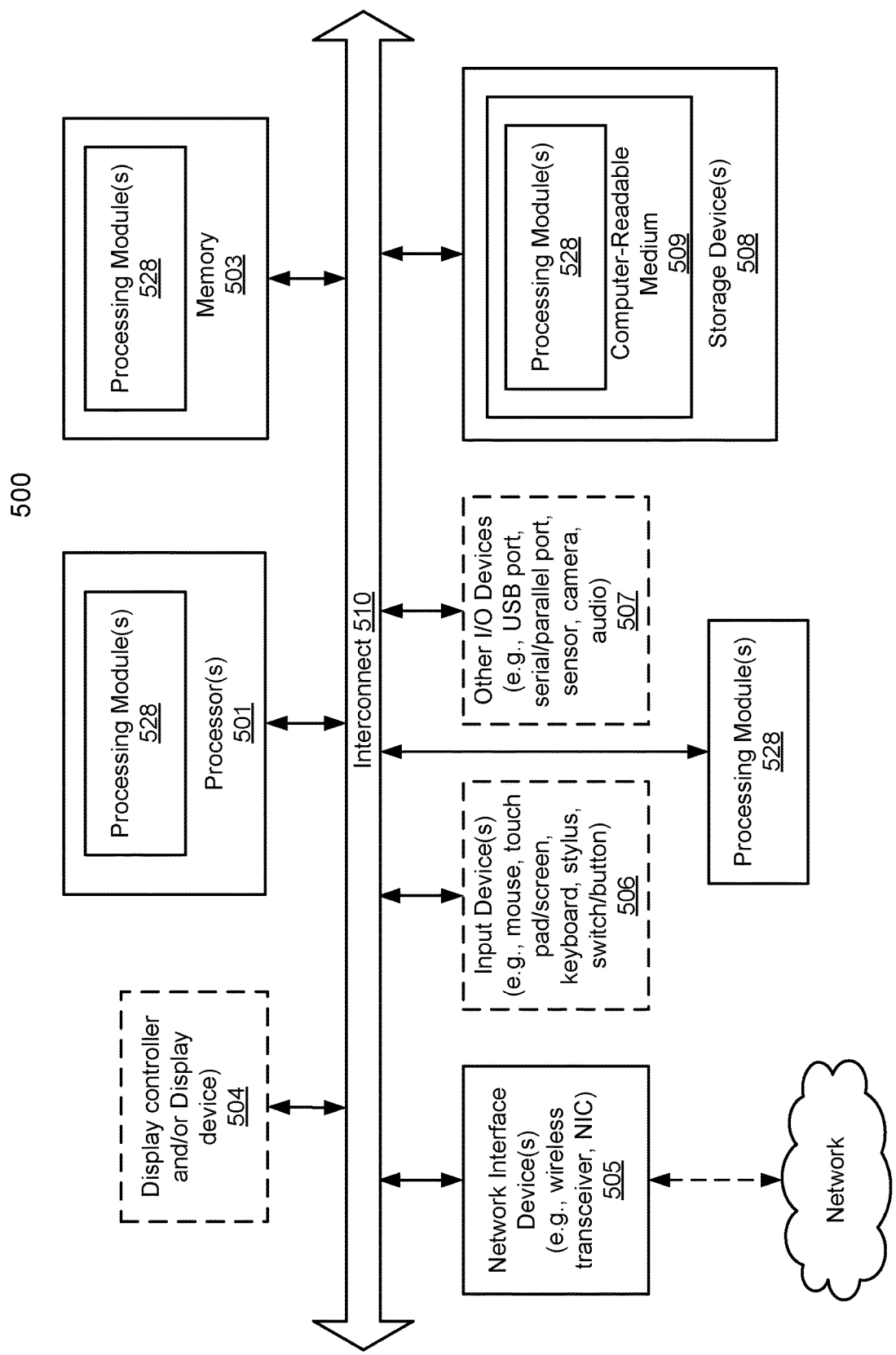
FIG. 5 shows a block diagram illustrating a data processing system in accordance with an embodiment.

Any of the components illustrated in FIGS. 1-4 may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux Unix °, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of processing data in a distributed environment using an anomaly detector comprising a continuously updated inference model that is continuously updated incrementally as new portions of non-anomalous data are identified, the method comprising:
    obtaining, by the anomaly detector, first data from a data collector;
    obtaining, by the anomaly detector, reconstructed data using the continuously updated inference model and the first data, the reconstructed data being intended to match the first data when the first data is not anomalous, the continuously updated inference model being trained on second data previously identified by the continuously updated inference model as being non-anomalous, the first data being obtained after the second data, and a copy of the second data is no longer available to the anomaly detector when the anomaly detector obtains the first data from the data collector;
    making a first determination, by the anomaly detector and using the continuously updated inference model, regarding whether the first data is anomalous, the first determination being based at least in part on the reconstructed data; and
    in a first instance of the first determination where the first data is anomalous, initiating a process based on the first data being anomalous.

2. The method of claim 1, further comprising:
    in a second instance of the first determination where the first data is not anomalous:
        making a second determination, by the anomaly detector and as part of an anomaly detection process performed by the anomaly detector where any obtained data from the data collector by the anomaly detector is always discarded from a computing device hosting the anomaly detector after the anomaly detector has completed the anomaly detection process for the obtained data regardless of whether the obtained data is determined to be anomalous or not anomalous, regarding whether the data that is already determined via the second instance of the first determination as not anomalous is useful to improve anomaly detection capabilities of the continuously updated inference model through training, the anomaly detection process further comprises the first determination, and the obtained data comprising the first data and the second data;
    in a first instance of the second determination where the first data that is already determined as not anomalous is useful, re-training, by the anomaly detector, the continuously updated inference model using the first data as training data to obtain an updated inference model and then subsequently discarding the first data after the training is completed; and
    in a second instance of the second determination where the first data that is already determined as not anomalous is not useful, discarding the first data without using the first data for inference model updating purposes.

3. The method of claim 2, wherein using the first data for inference model updating purposes further comprises:
    treating the first data as training data; and
    re-training the continuously updated inference model using the training data to obtain an updated inference model, the updated inference model being more likely to reconstruct data with a lower deviation from the first data than the continuously updated inference model.

4. The method of claim 3, wherein re-training the continuously updated inference model comprises:
    freezing a portion of the continuously updated inference model prior to re-training the continuously updated inference model to obtain a frozen portion of the continuously updated inference model, and
    modifying portions of the continuously updated inference model that are not part of the frozen portion of the continuously updated inference model based on the first data to obtain the updated inference model.

5. The method of claim 4, wherein freezing the portion of the continuously updated inference model renders the frozen portion of the continuously updated inference model unaffected by the re-training of the continuously updated inference model.

6. The method of claim 1, wherein making the first determination further comprises:
    obtaining a reconstruction loss, the reconstruction loss being based on the first data and the reconstructed data;
    making a third determination regarding whether the reconstruction loss is within an anomaly threshold;
    in a first instance of the third determination where the reconstruction loss is within an anomaly threshold, classifying the first data as not anomalous; and
    in a second instance of the third determination where the reconstruction loss is not within an anomaly threshold, classifying the first data as anomalous.

7. The method of claim 6, wherein the continuously updated inference model comprises an autoencoder and the reconstructed data is an output of the autoencoder.

8. The method of claim 7, wherein the reconstruction loss measures a deviation of the reconstructed data from the first data, with the reconstruction loss increasing as the deviation increases.

9. The method of claim 8, wherein making the second determination further comprises:
   making a fourth determination regarding whether the reconstruction loss of the first data that is already determined as not anomalous is within a calibration threshold for the continuously updated inference model;
   in a first instance of the fourth determination where the reconstruction loss is within a calibration threshold, classifying the first data that is already determined as not anomalous as not useful for a retraining of the continuously updated inference model; and
   in a second instance of the fourth determination where the reconstruction loss is outside the calibration threshold, classifying the first data that is already determined as not anomalous as useful for the retraining of the continuously updated inference model.

10. The method of claim 9, wherein the anomaly threshold defines a first range of values of the reconstruction loss, the calibration threshold defines a second range of values of the reconstruction loss, and the values of the reconstruction loss within the first range are larger than the values of the reconstruction loss within the second range.

11. The method of claim 1, wherein the anomaly detector is hosted on a computing device and the anomaly detector always discards any collected data obtained from the data collector after the anomaly detector has completed an anomaly detection process for the data regardless of whether the collected data is determined to be anomalous or non-anomalous during the anomaly detection process, the collected data comprising the first data and the second data, and the anomaly detection process comprises at least:
   the obtaining of the reconstructed data; and
   a retraining of the continuously updated inference model using the collected data when the collected data is determined by the anomaly detector to be non-anomalous and useful for the retraining of the continuously updated inference model.

12. The method of claim 1, wherein the obtaining the reconstructed data comprises, by the anomaly detector and at least:
   determining a first time within a first day at which the first data was collected by the data collector; and
   reconstructing the first data based on previous data that was collected by the data collector at a second time within a second day different from the first day to obtain the reconstructed data, the previous data comprising the second data, the second time being identical to the first time, the previous data being previously determined by the anomaly detector as being non-anomalous and being previously used to retrain the continuously updated inference model, and the previous data being discarded by a computing device hosting the anomaly detector before the first data is obtained by the anomaly detector from the data collector.

13. A non-transitory machine-readable medium having instructions stored therein, which when executed by a processor, cause the processor to perform operations for processing data in a distributed environment using an anomaly detector comprising a continuously updated inference model that is continuously updated incrementally as new portions of non-anomalous data are identified, the operations comprising:
   obtaining, by the anomaly detector, first data from a data collector;
   obtaining, by the anomaly detector, reconstructed data using the continuously updated inference model and the first data, the reconstructed data being intended to match the first data when the first data is not anomalous, the continuously updated inference model being trained on second data previously identified by the continuously updated inference model as being non-anomalous, the first data being obtained after the second data, and a copy of the second data is no longer available to the anomaly detector when the anomaly detector obtains the first data from the data collector;
   making a first determination, by the anomaly detector and using the continuously updated inference model, regarding whether the first data is anomalous, the first determination being based at least in part on the reconstructed data; and
   in a first instance of the first determination where the first data is anomalous, initiating a process based on the first data being anomalous.

14. The non-transitory machine-readable medium of claim 13, wherein the operations further comprise:
   in a second instance of the first determination where the first data is not anomalous:
      making a second determination, by the anomaly detector, regarding whether the first data that is determined via the second instance of the first determination as not anomalous is useful to improve anomaly detection capabilities of the continuously updated inference model through training;
      in a first instance of the second determination where the first data that is not anomalous is useful, re-training, by the anomaly detector, the continuously updated inference model using the first data that is already determined as not anomalous as training data to obtain an updated inference model and discarding the first data; and
      in a second instance of the second determination where the first data that is not anomalous is not useful, discarding the first data that is already determined as not anomalous without using the first data for inference model updating purposes.

15. The non-transitory machine-readable medium of claim 14, wherein making the first determination further comprises:
   obtaining a reconstruction loss, the reconstruction loss being based on the first data and the reconstructed data;
   making a third determination regarding whether the reconstruction loss is within an anomaly threshold;
   in a first instance of the third determination where the reconstruction loss is within an anomaly threshold, classifying the first data as not anomalous; and
   in a second instance of the third determination where the reconstruction loss is not within an anomaly threshold, classifying the first data as anomalous.

16. The non-transitory machine-readable medium of claim 15, wherein the continuously updated inference model comprises an autoencoder and the reconstructed data is an output of the autoencoder.

17. A data processing system, comprising:
   a processor; and
   a memory coupled to the processor to store instructions, which when executed by the processor, cause the processor to perform operations for processing data in a distributed environment using an anomaly detector comprising a continuously updated inference model that is continuously updated incrementally as new portions of non-anomalous data are identified, the operations comprising:

obtaining, by the anomaly detector, first data from a data collector;

obtaining, by the anomaly detector, reconstructed data using the continuously updated inference model and the first data, the reconstructed data being intended to match the first data when the first data is not anomalous, the continuously updated inference model being trained on second data previously identified by the continuously updated inference model as being non-anomalous, the first data being obtained after the second data, and a copy of the second data is no longer available to the anomaly detector when the anomaly detector obtains the first data from the data collector;

making a first determination, by the anomaly detector and using the continuously updated inference model, regarding whether the first data is anomalous, the first determination being based at least in part on the reconstructed data; and in a first instance of the first determination where the first data is anomalous, initiating a process based on the first data being anomalous.

18. The data processing system of claim 17, wherein the operations further comprise:

in a second instance of the first determination where the first data is not anomalous:

making a second determination, by the anomaly detector, regarding whether the first data that is determined via the second instance of the first determination as not anomalous is useful to improve anomaly detection capabilities of the continuously updated inference model through training;

in a first instance of the second determination where the first data that is not anomalous is useful, re-training, by the anomaly detector, the continuously updated inference model using the first data that is already determined as not anomalous as training data to obtain an updated inference model and discarding the first data; and in a second instance of the second determination where the first data that is not anomalous is not useful, discarding the first data that is already determined as not anomalous without using the first data for inference model updating purposes.

19. The data processing system of claim 18, wherein making the first determination further comprises:

obtaining a reconstruction loss, the reconstruction loss being based on the first data and the reconstructed data;

making a third determination regarding whether the reconstruction loss is within an anomaly threshold;

in a first instance of the third determination where the reconstruction loss is within an anomaly threshold, classifying the first data as not anomalous; and in a second instance of the third determination where the reconstruction loss is not within an anomaly threshold, classifying the first data as anomalous.

20. The data processing system of claim 19, wherein the continuously updated inference model is an autoencoder and the reconstructed data is an output of the autoencoder.

* * * * *